United States Patent [19]

McNerney

[11] Patent Number: 4,934,026

[45] Date of Patent: Jun. 19, 1990

[54] SHIPPING CARTON FOR FURTHER PROCESSING OF PRODUCT
[75] Inventor: Robert J. McNerney, 515 Signal Rd., Newport Beach, Calif. 92663
[73] Assignees: Marvin Wayne Lynn, Mission Viejo; Robert J. McNerney, Newport Beach, both of Calif.
[21] Appl. No.: 247,692
[22] Filed: Sep. 22, 1988
[51] Int. Cl.⁵ .............................. B26D 7/02
[52] U.S. Cl. ..................... 17/1 S; 83/762; 83/454
[58] Field of Search ............. 17/1 S; 83/167, 762, 83/743, 821, 454; 227/139

[56] References Cited

U.S. PATENT DOCUMENTS

| | | |
|---|---|---|
| 179,934 | 7/1876 | Merwin . |
| 806,885 | 12/1905 | Focht . |
| 1,462,717 | 7/1923 | Maus . |
| 1,778,485 | 10/1930 | Davidson . |
| 1,815,101 | 1/1931 | Goldstein . |
| 2,021,425 | 10/1931 | Nielsen . |
| 2,210,765 | 8/1940 | Mahlke . |
| 2,303,566 | 12/1942 | Majestic . |
| 2,609,564 | 9/1952 | Grimm . |
| 2,740,632 | 1/1954 | Balmer . |
| 2,815,530 | 12/1957 | Alexander . |
| 2,859,685 | 11/1958 | Alexander . |
| 3,085,323 | 4/1963 | Handley . |
| 3,213,486 | 10/1965 | Blake . |
| 3,224,076 | 12/1965 | Johnson, Jr. et al. . |
| 3,234,585 | 2/1966 | Snyder . |
| 3,292,252 | 12/1966 | Reading . |
| 3,306,486 | 2/1967 | Martino et al. . |
| 3,339,478 | 9/1967 | Crow . |
| 3,354,529 | 11/1967 | James . |
| 3,405,422 | 10/1968 | Sico et al. . |
| 3,579,713 | 5/1971 | Kang et al. . |
| 3,635,732 | 1/1972 | Bissett . |
| 3,717,473 | 2/1973 | Bissett . |
| 3,729,774 | 5/1973 | Chow . |
| 3,776,601 | 10/1973 | Heighberger . |
| 3,889,805 | 6/1975 | Korten . |
| 3,942,678 | 3/1976 | Heydemann . |
| 4,056,026 | 11/1977 | Panaritis et al. ............... 83/762 |
| 4,076,116 | 2/1978 | Sowders . |
| 4,113,398 | 9/1978 | Jordan . |
| 4,158,424 | 6/1979 | Carmack . |
| 4,164,675 | 9/1979 | Sato et al. . |
| 4,186,844 | 2/1980 | Swanson . |
| 4,342,402 | 8/1982 | Jungles . |
| 4,352,242 | 10/1982 | Plet . |
| 4,401,312 | 8/1983 | Parker . |
| 4,429,435 | 2/1984 | Walls . |
| 4,450,976 | 5/1984 | Snyder et al. . |
| 4,583,263 | 4/1986 | Wigley, Jr. . |
| 4,604,771 | 8/1986 | Dollé . |

FOREIGN PATENT DOCUMENTS

| | | |
|---|---|---|
| 2633553 | 2/1976 | Fed. Rep. of Germany . |
| 2844474 | 8/1980 | Fed. Rep. of Germany . |
| 10296 | of 1905 | United Kingdom . |

OTHER PUBLICATIONS

"Mobile Trash Container Having a Hinged Lid", Supplement to Patent Application P 26 14 535 (6 pages).

Primary Examiner—Willis Little
Attorney, Agent, or Firm—Knobbe, Martens, Olson & Bear

[57] ABSTRACT

A shipping assembly for a product, such as kebabs, designed to permit the receiver to complete the processing of the product including a generally rectangular outer shipping container, a generally rectangular slotted inner container within the outer container, a plurality of layers of product within the inner container, and a lower tray within the inner container spacing and supporting the plurality of layers of product above the bottom of the inner container. The outer container has a closed bottom, two pairs of opposing vertical sides and at least one end flap for closing the top of the outer container. The inner container has a closed bottom, two pairs of opposing vertical sides, and an open top. Each of the opposing sides includes at least one vertical slot for receiving the blade of a cutting device. At least one slot in each side is aligned with a corresponding slot in the opposing side to permit a cutting device to be inserted through the container through the corresponding slots. A plurality of skewers may be inserted through the plurality of layers of product, strengthening the assembly and permitting the product to be cut into kebabs by means of slicing the product into cubes with a cutting blade extending through corresponding slots in the opposing sides of the vertical sides of the inner container.

5 Claims, 3 Drawing Sheets

SHIPPING CARTON FOR FURTHER PROCESSING OF PRODUCT

BACKGROUND OF THE INVENTION

This invention relates to shipping containers and to devices for assembling kebabs.

Manual cutting of uniform cubes of meat and vegetables for assembly into shish kebabs is an arduous and time-consuming task if more than a relatively small number of kebabs are being assembled. For this reason, a relatively wide variety of devices have been developed to relieve the individual from the task of cutting each vegetable and piece of meat separately.

One such device for cutting "mock chicken legs" (i.e., cubes of meat on skewers) is disclosed in U.S. Pat. No. 2,609,564. The device includes a table, a slotted box, a motor and a series of reciprocating blades. The table forms a square depression which is aligned with the reciprocating blades and which is sized to receive the box. The box has two opposing pairs of vertical sides and a bottom in which there is formed a grid of uniformly spaced rows and columns of grooves, in checkerboard fashion. Each pair of sides includes a series of vertical slots aligned with the grooves of the bottom. The machine is further provided with a top plate which rests within the sides of the box upon vertical spacer posts.

In operation, a plurality of layers of meat are placed in the box and are compressed by the top plate. A plurality of skewer sticks are then inserted downwardly through a series of countersunk apertures in the top plate, through the meat layers and into a corresponding series of countersunk bores at the bottom. The top plate is then removed, and the series of reciprocating blades is aligned in the top of the slots in one of the box's pair of opposing sides. The motor is then activated, causing the blades to cut through the meat to the bottom of the box. The blades are then removed from the box, and the box is lifted and turned horizontally 90° and replaced in the recess of the table plate. The cutting operation is then repeated, whereupon the contents of the box forms a plurality of mock chicken legs.

Although kebab processing devices are available, however, no kebab processing device has gained widespread popularity in restaurants or butcher shops. A primary reason for this is that most restaurants and butcher shops do not make enough kebabs to justify the expense of the devices heretofore available. Furthermore, even where expense is not a deterrent, the need to economize on the use of space usually is. That is, due to the generally bulky nature of these devices, most restaurants or small butcher shops cannot justify the space required to store these devices.

These difficulties have led larger meat distribution centers, where the volume of kebabs processed can justify the expense and space of these prior art kebab processing devices, to prepare the kebab themselves for distribution to restaurants and butcher shops. Even at these larger meat distribution centers, however, the prior art devices have failed to gain acceptance and the kebabs are usually prepared by hand. Due to the delay between the processing of kebabs at these larger meat distribution centers, and the consumption of the kebabs by the consumer, significant spoilage problems arise. Once the meat and vegetables are cut into small cubes on individual skewers, air is able to envelop the kebabs on all sides, greatly diminishing the time period in which the meat and vegetables will remain fresh.

In addition to spoilage, however, the processing of kebabs at large meat distribution centers poses significant transportation problems. Specifically, the kebabs must be transported in a manner which will minimize the extent to which the kebabs rub against one another, to avoid vegetables being broken from the skewers or causing the meat and vegetables to lose their crisp or fresh-cut appearance. As a result, the assembled kebabs can take up more volume than the corresponding amount of meat and vegetables required in their assembly.

There is needed an improved means of processing kebab which will diminish the amount of time and labor involved in processing the kebabs while remaining cost- and space-efficient. Further, there is also needed an improved means of shipping kebabs to maximize the use of space, while minimizing spoilage and damage to the kebabs.

SUMMARY OF THE INVENTION

The present invention meets the needs of the prior art by providing an assembly particularly adapted for both the further processing of product and the shipping of such product.

One aspect of the invention is a shipping assembly for the further processing of product, such as partially processed kebabs, including an outer shipping container, a generally rectangular inner container within the outer container and a plurality of layers of product within the inner container. The inner container has a closed bottom, an open top and two pairs of opposing vertical sides. Each of the opposing sides includes at least one vertical slot for receiving the blade of a cutting device. At least one slot in each side is aligned with a corresponding slot in the opposing side to permit a cutting device to be inserted through the container through the corresponding slots.

The assembly can be shipped to the final destination, whereupon the generally rectangular inner container may be removed from the outer shipping container and layers of product can be cut into pieces by means of inserting the blade of a cutting device through the slots of the inner container and sawing downward. For the processing of kebabs, it is desirable that the shipping assembly include a plurality of skewers, which extend through the plurality of layers of product. The sawing of the skewered product into pieces, results in the forming of finished kebabs. The insertion of skewers prior to shipping not only eliminates the need for assembling the cubes of product on the skewers after cutting, but substantially strengthens the assembly during shipment.

In addition, the shipping assembly may be further provided with a moisture-resistant liner within the inner container positioned between the plurality of layers of product and the inner container. This liner serves the dual purpose of protecting the inner container from moisture, while protecting the product within the liner from exposure to the air.

Another aspect of the invention is a shipping assembly for the further processing of product including a generally rectangular outer shipping container, a generally rectangular slotted corrugated paper container insertable within the outer container, and a generally rectangular tray insertable within the corrugated container. The tray includes an upper surface for spacing and supporting a plurality of layers of product above the bottom of the corrugated container. The assembly may include a plurality of skewers extendable through a plurality of layers of product within the corrugated container. Where kebabs, rather than individual cubes of meat are desired, the assembly may also include an upper tray. Desirably, the upper tray will have a series of apertures which can be horizontally aligned with a corresponding series of apertures in the lower tray. Skewers may be inserted through the product and the apertures of the tray or trays either prior to or after shipment.

The assembly provides a compact, convenient package for the refrigeration, storage and/or shipment of the product. Since the design of the assembly lends itself to manufacture by highly inexpensive materials, the assembly is not only inexpensive, but also economizes on space, as it need only be retained while used to ship or store products, after which point it can be discarded.

One of the important aspects of the invention is that the assembly effectively minimizes the amount of surface area of product exposed to the air. Due to the dense packing of the layers of product upon one another, the surface area exposed to the air is limited to the portion of the surface area of the exterior of the cubes formed by the stacked layers of product which contact the air through the slots of the inner container. When the assembly further comprises a moisture resistant liner between the layers of product and the inner container, the amount of total surface area exposed to the air is further diminished.

The unique design of the assembly further lends itself to the use of blocks of insulating material, which decrease spoilage by preventing the product from warming quickly in a non-refrigerated environment.

Another important aspect of the invention is the manner in which the shipping assembly prevents the product from damage. In embodiments of the invention where both an inner container and an outer container are utilized, the sides of the inner container reinforce the sides of the outer container and the sides of the outer container reinforce the sides of the inner container, complimenting one another and limiting potential damage to the product contained within the assembly. Where the assembly is shipped with skewers extending through the product, the skewers provide significant added tensile strength to the assembly. Furthermore, by shipping the product in a densely packed block within the assembly, the exterior layers of product protect the interior layers of product from damage. This is so even where the product is cut into cubes prior to shipment, due to the virtually perfectly matched surface of the adjoining cubes of product.

DETAILED DESCRIPTION OF THE PREFERRED EMBODIMENT

For purposes of illustration, the shipping assembly of the present invention will be described in connection with a shipping assembly 11, shown in FIG. 1, especially suited for the further processing of meat and vegetables for the processing of forming kebabs.

Figure 2:
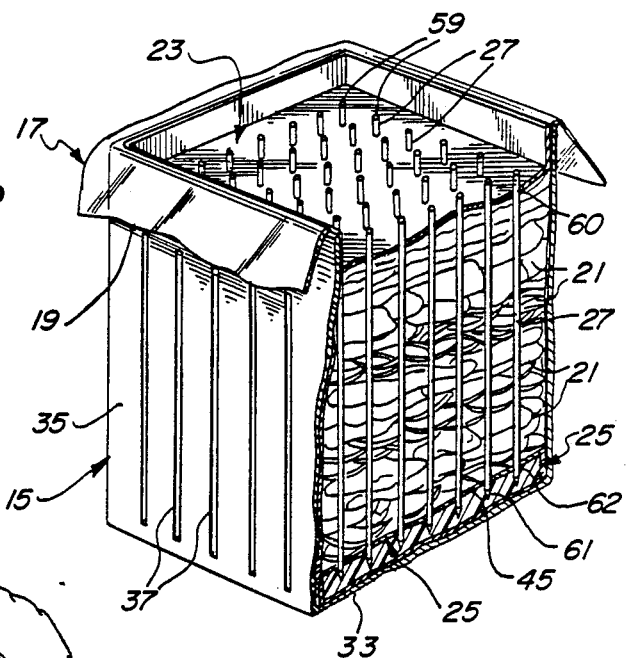
FIG. 2 perspective view of an assembled shipping of FIG. 1 with the outer shipping container and layer removed.

The three largest components of the assembly 11 are an outer master shipping container 13, an open top slotted inner container 15 and a flexible moisture-resistant liner 17. The outer container 13 surrounds the inner container 15 and the liner 17. The liner 17 conforms to the interior of the inner container 15, except at the top where it flares downward and outward, forming a short skirt 19. Referring to FIG. 2, a plurality of layers of product 21 are contained within the inner container 15, where they are sandwiched between an upper tray 23 and a lower tray 25. A plurality of skewers 27 extend vertically through the layers 21 of product and the upper and lower trays 23, 25, tying the layers of product and the components of the assembly into a single solid compact unit.

Referring now to Figure the master shipping container 13 or box is preferably a 275C strength water-resistant adhesive corrugated paper container curtain coated on both sides which has a closed rectangular bottom (not shown), each of the four peripheral edges of which is integrally formed with a vertical rectangular side 29. Each of the vertical peripheral edges of each side forms a 90° angle with, and is integrally joined to, the adjacent peripheral vertical edge of each adjacent side. Thus, it will be appreciated that the sides of the container 13 form two pairs of opposing parallel vertical sides joined to one another along their vertical outer edges. Extending upward from and integrally joined to the horizontal upper edge of each of the sides is a generally rectangular flap 31 extending the width of the side 29 and adapted to cooperate with the other end flaps to close the top of the master container 13. Obviously, the size and number of the flaps could be varied, but it is desirable that the flaps cooperate to completely close the top of the container. Naturally, it would also be possible for the assembly to utilize an outer container 13 sealed by means of a separate top, rather than through the use of integrally formed end flaps.

The slotted container 15 or "jig" has a closed rectangular bottom 33, each of the four peripheral outer edges of which is integrally joined to the lower edge of a slotted rectangular side 35. Each of the vertical peripheral edges of each side forms a 90° angle with, and is integrally joined to, the adjacent peripheral vertical edge of each adjacent side. Accordingly, it will be appreciated that the slotted container 15 includes two pairs of opposing parallel vertical sides with each pair of opposing vertical sides being joined together by the other pair of opposing vertical sides. Each side of the container includes an equal number of parallel punched vertical slots 37. The slots 37 extend from near the bottom of the slotted container to a point spaced slightly from the top of the slotted container. The tops of the slots 37 are spaced somewhat from the top of the slotted carton to increase the integrity of the slotted carton and prevent it from ripping. Each slot is parallel to and horizontally aligned with a corresponding slot in the opposing vertical side. That is, an object inserted through a given slot 39 at a 90° angle to the side in which the slot extends will pass through a corresponding slot 41 in the opposing vertical side.

It is an important advantage of the present invention that the size, length and number of the slots can be varied depending upon the size and length of the product desired. Advantageously, the slots are spaced an equal distance from the adjacent sides of the container and from one another, the desirability of which will be discussed in detail later. Preferably, the slotted container 15 comprises a 275C strength water-resistant adhesive corrugated paper container with a glued joint and curtain coating on both sides to provide extra moisture resistance.

The liner 17 is positioned within the sides of the slotted container to ensure that the integrity of the slotted container 15 and the outer container 13 is not destroyed by water or juices released by the product during shipment or storage. The liner is desirably a gusseted moisture-proof, 2 mil polyethylene bag having a bottom (not shown) and four sides 43 which conform to the interior surfaces of the slotted container.

The corrugated paper lower tray 25 is preferably curtain coated on both sides and includes a planar rectangular upper surface 45 and four downwardly extending vertical sides 47 and is snugly insertable within the slotted container 15 and the moisture-resistant liner 17. The sides 47 of the tray are integrally formed with the peripheral edges of the upper surface 45 of the tray and space the tray above the bottom of the slotted container. The upper surface of the tray may be provided with a series of apertures 47, arranged in rows and columns to receive the points of skewers. Desirably, each of the apertures 47 corresponds to the midpoint between a vertical slot 39 of the inner container 13 and the adjacent vertical slot or side, the significance of which will be discussed below.

The lower tray 25 straddles a solid, generally rectangular polyethylene, styrofoam or other USDA-approved block of insulating material 49, the vertical sides 51 of which are slightly narrower and shorter than the sides 47 of the lower tray 25. The block 49 reinforces the upper surface 45 of the tray and insulates the assembly 11 against changes in temperature without appreciably affecting the product carrying capacity of the assembly.

Layers of product 21, such as alternating layers of sliced beef, chicken, onions and peppers, are stacked on the upper surface 45 of the lower tray 25 in generally rectangular layers corresponding to the sides 35 of the slotted container 15 and the liner 17. The height of the stacked layers 21 is equal to the length of the kebabs desired, but should not be higher than the height of the slots 41. The densely packed layers 21 essentially form a solid block of product.

The upper tray 23 is preferably curtain coated on both sides and has a planar rectangular lower surface 53 and four upwardly extending vertical sides 55 having widths slightly narrower than the width of the interior of the slotted container 15 and is insertable within the slotted container 15 and the liner 17 over the layers of product 21. Advantageously, the lower surface 53 of the upper tray 23 is provided with a series of apertures 57 arranged in rows and columns corresponding to the rows and columns of apertures 47 in the upper surface 45 of the lower tray 25.

Elongate skewers 27, each having a flat upper end 59 and a pointed lower end 61, extend vertically downward through each of the apertures 57 of the upper tray 23, through the layers of product 21, through horizontally aligned corresponding apertures 47 in the upper surface of the lower tray and into the block of insulating material 49 positioned between the sides 47 of the lower tray 25. That is, as shown in FIG. 2, a skewer extending substantially vertically downward through an given aperture 60 in the upper tray 23 at an angle of 90 degrees to the lower surface 53 of the upper tray will extend through a corresponding horizontally aligned aperture 62 in the lower tray 45. Advantageously, the tops of the skewers 27 are flat and are positioned in a single plane spaced below the horizontal upper edge of the sides of the upper tray.

Figure 5:
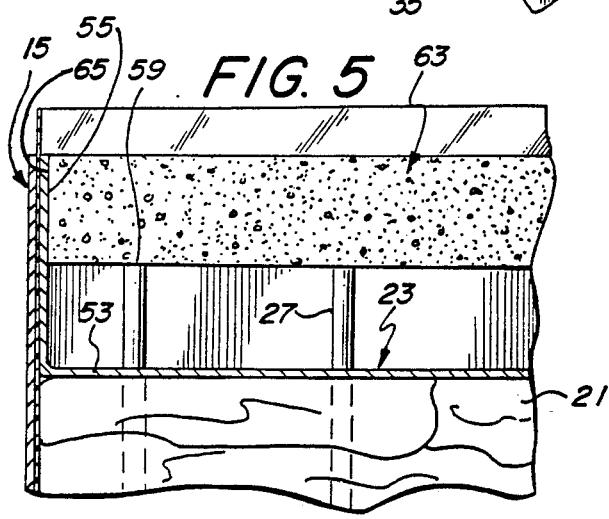
FIG. 5 is a partial sectional view illustrating the relationship the upper tray and skewers of the assembly of FIG. 1.

A solid, generally rectangular block of insulating material 63, such as polyethylene, having vertical sides 65 slightly narrower than the inside of the vertical sides 55 of the upper tray 23 is positioned between the vertical sides of the upper tray over the upper ends 59 of the skewers 27. Desirably, the height of the block 63 is such that the upper surface of the block is flush with the top of the upper tray and the slotted container (as shown in FIG. 5). The block 63 reinforces the top flaps 31 of the outer container 13 and insulates the assembly 11 against changes in temperature without appreciably effecting the product carrying capacity of the assembly 11.

Figure 6:
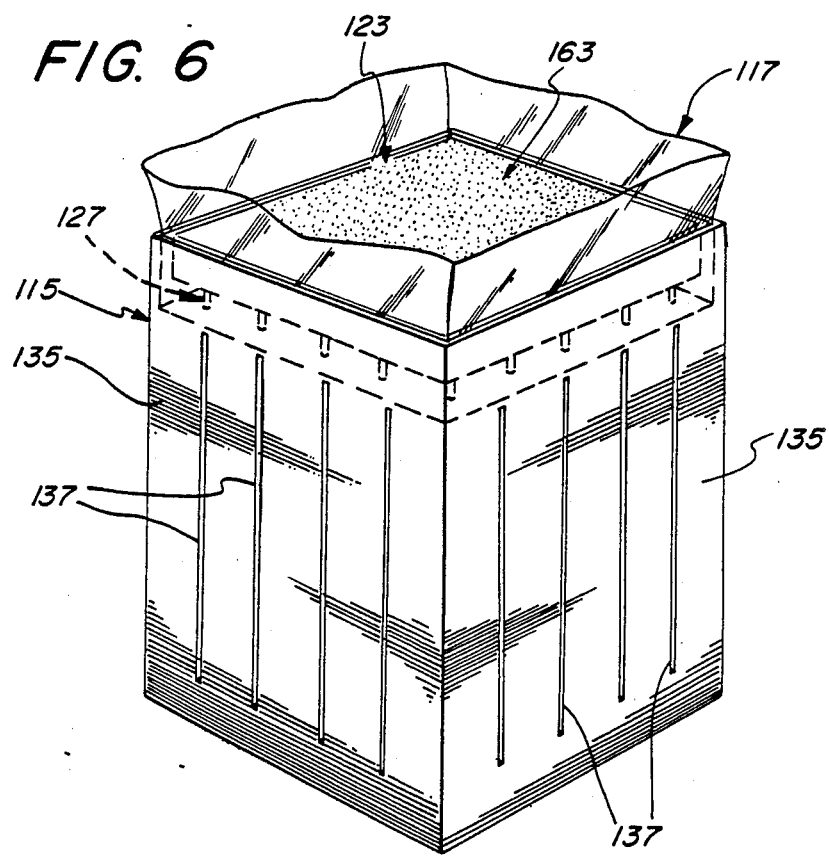
FIG. 6 is a perspective view of an assembled embodiment of the shpping assembly of the invention with the outer container removed.

Referring now to FIG. 6, there is shown a shipping assembly 111 which has been found to be particularly well adapted for shipping, storage and processing of kebabs. The assembly 111 is used in connection with a master shipping container, as shown in FIG. 1, having a closed 7⅞" by 7⅞" rectangular bottom, and four 7⅞" by 11 3/16" vertical rectangular sides. The slotted container 115 has a closed 7½" by 7½" rectangular bottom (not shown) and four 7½" by 11" rectangular sides 135. Each side 135 of the container includes four ⅛" wide parallel punched vertical slots 137, which extend from near the bottom of the container to a point spaced slightly from the top of the slotted container.

The liner 117 of the assembly has a 7½" by 7½" bottom (not shown) and four 7½" by 17" sides. The lower tray includes a planar 7 5/16" by 7 5/16" rectangular upper surface and four downwardly extending 7 5/16" by 1" vertical sides. Beneath the lower tray is a 7½" by 7½" by ¼" styrofoam block of insulating material. The upper tray 123 has a 7 5/16 " by 7 5/16 " rectangular lower surface and four 7 5/16 " by 2" upwardly extending vertical sides. The assembly 111 is further provided with skewers 127 having a flat upper end and a solid generally rectangular block of insulating material 163 slightly narrower than the inside of the vertical slides of the upper tray positioned over the upper ends of the skewers wherein the height of the block is such that the upper surface of the block is flush with the top of the upper tray and the slotted container.

It will be appreciated that when the slotted container 15 is inserted within the outer shipping container 13 and the top flaps 31 of the outer container are sealed closed, the assembly 11 provides a compact, convenient package for the refrigeration, storage and/or shipment of product for kebab and/or stew meat. Specifically, the product is densely packed in a conveniently shaped assembly which maximizes the utilization of space and can be stored or shipped in standard trucks and refrigeration units.

One of the important aspects of the invention is that the unique design of the assembly 11 effectively minimizes the amount of surface area of product exposed to the air. First, due to the dense packing of the layers of product 21 upon one another, the amount of surface area potentially exposed to air, even without the use of the moisture-proof liner 17, is limited to the portion of surface area of the exterior of the block formed by the stacked layers 21 which contact the air through the slots 35 of the inner container 15. Through the use of a moisture-proof liner 17, the unique design of the assembly protects the sides and to a large extent the bottom of the layers of product 21 from exposure to the air, thereby further diminishing the amount of total surface area exposed. Finally, the upper tray 23 of the assembly covers the upper layer of product during storage or shipment, thereby further diminishing the total amount of surface area of product exposed.

In addition to the limited exposure of product to air, the shipping assembly 11, especially the upper and lower blocks of insulating material, insulate the product from the environment, preventing the product from warming quickly in non-refrigerated environments, to further diminish spoilage.

The unique design of the shipping assembly prevents the product being shipped from damage. The use of the slotted shipping container 15 in connection with the outer shipping container 13 protects the sides of the block of product formed by the layers by a double layer of corrugated paper. Advantageously, the slotted container 15 is only enough smaller than the outer container 11 that it is able to slide snugly into the cavity formed by the sides 29 of the outer container 13. This enables the sides 29 of the outer container 13 to reinforce the sides 35 of the slotted container 15, preventing them from bowing outward and/or twisting out of alignment during shipment. This is important in that it facilitates the cutting of the layers of product into uniform cubes or kebab.

Another important aspect of the invention which prevents the product of the assembly from being damaged is the presence of the skewers extending vertically through the cube of densely packed product. The layers of product reinforce the skewers, and the skewers resist compression and tensile stresses on the assemblies. As a result, the assemblies provide yet additional space savings during shipping through their ability to be stacked upon one another without damage to the product. As it is anticipated that the assembly will be shipped with the layers of product in their uncut state, the interior of the block of product formed by the layers will be further protected from injury by the surrounding densely packed product. Further, the process of inserting the skewers through the layers of product has the affect of densely packing the layers of product together, creating a stronger more condensed unit.

Another important aspect of the invention is that the shipping assembly 11 takes up virtually no more room at the restaurant or butcher shop than would the product itself. Actually, when a significant amount of produce is used, the storage of the partially-processed produce can require significantly less space than the unprocessed meat and produce. The entire assembly can simply be stored in an ordinary refrigeration unit until such time as it is desired to further process the product, cutting the block of product into individual kebabs. Due to the extremely inexpensive nature of the materials used to construct the non-product portion of the shipping assembly, the non-product portion of the shipping assembly may be simply discarded. Thus, the assembly provides guides for the fast and easy cutting of product into uniform kebabs or stew meat, without the attendant drawbacks of relatively high cost and necessary storage space.

Although the use of the outer container 13 is desirable, it would be possible to utilize a shipping assembly without an outer container. Such an assembly would generally include a liner to protect both the slotted container 15 and the product 21 within from damage. Advantageously, the liner would include a longer skirt which could be sealed over the product during shipment. In the alternative, the slotted container could be provided with flaps or a separate top to seal the product within the assembly.

The use of the assembly 11 of the present invention will now be briefly described. First, the liner 17 is inserted into the inner container 15 and the inner container itself is inserted into the outer container 13. The lower block of insulating material 49 is then inserted into the inner container 15 and the lower tray 25 is inserted over the block 49. Next, layers of product 21 are stacked within the inner container 15 on top of the lower tray 25. When enough layers of product 21 have been stacked within the inner container 15 to reach the top of the slots 37 of the inner container, the upper tray 23 is inserted into the open top of the inner container 15 until the top of the sides 55 of the upper tray 23 are flush with the tops of the sides 35 of the inner container 15. The pointed ends 61 of the skewers 27 are then inserted by hand or with a simple plunging device through the series of apertures 57 in the lower surface 53 of the upper tray 23, through each of the plurality of layers of product 21, through the corresponding series of apertures 47 in the lower tray and into the block of insulating material 49 beneath the upper surface 45 of the lower tray 25. The upper block of insulating material 63 is then inserted into the inner container 15 between the vertical sides 55 of the upper tray 23, and the flaps 31 of the outer container 13 are sealed closed for storage or shipment.

Figure 3:
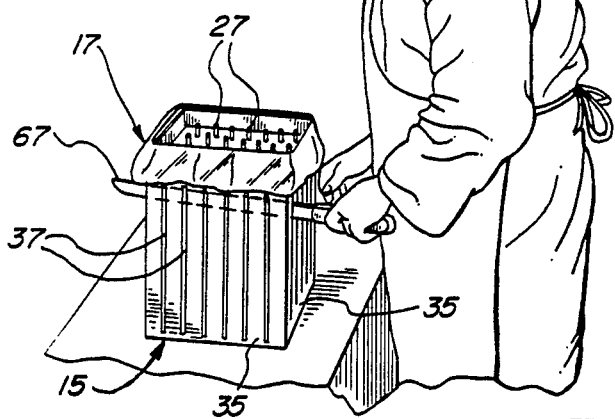
FIG. 3 is a perspective view illustrating the sawing of the layers of products within the assembly of FIG. 2.
Figure 4:
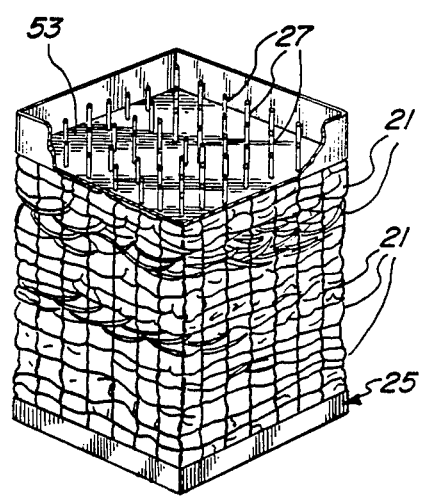
FIG. 4 is a perspective view illustrating the assembly of FIG. 3 after the product has been cut and the inner container has been removed.
Figure 7:
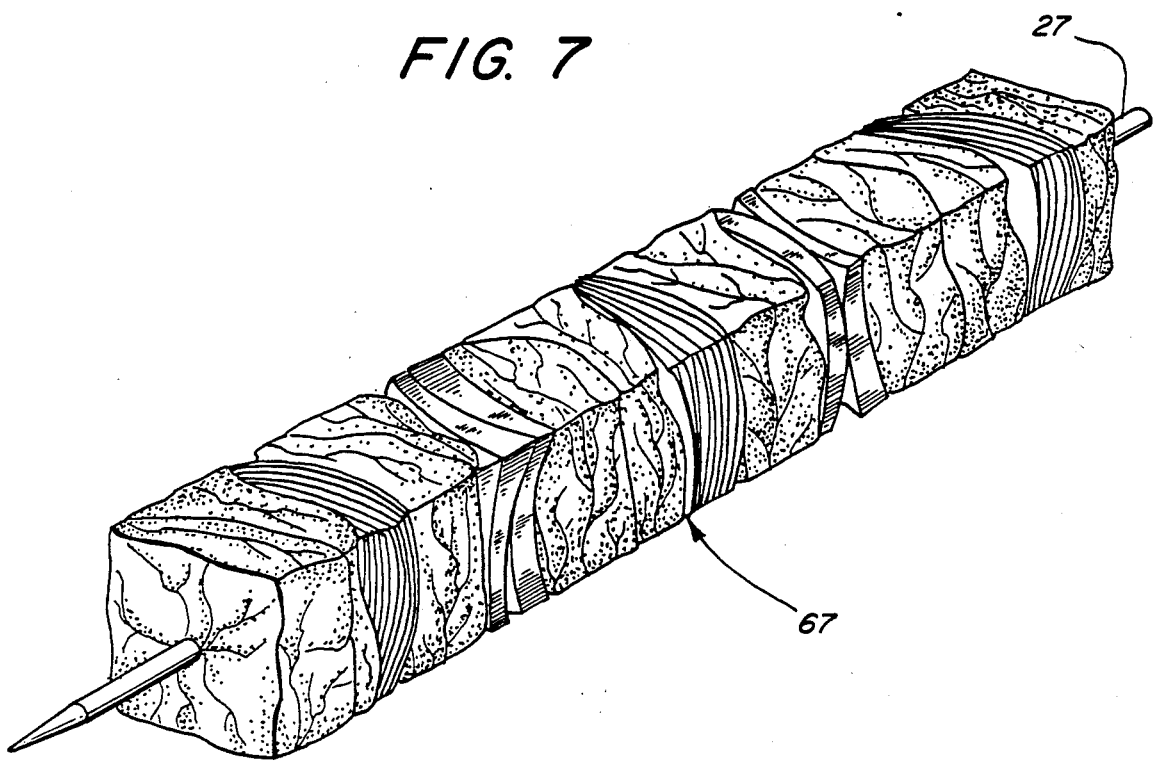
FIG. 7 is a perspective view of a kebab processed in accordance with the principles of the present invention.

Upon delivery to the desired destination, or when the product is desired to be removed from storage for further processing, the outer container 13 can be slipped off the slotted container 15 or, more easily, simply torn or cut away. Referring now to FIGS. 3 and 4, after the outer container 13 has been removed, a cutting device 67, such as a knife, is horizontally inserted through the top of each pair of corresponding vertical slots through the liner 17 and the top layers of product 21. The cutting device is then sawed horizontally back and forth until the cutting device slices through th elayers of product down to the upper surface 45 of the lower tray 25. Since each of the slots 37 are spaced an equal distance from the adjacent slot or vertical edge of the inner container 15, after this process has been repeated for each pair of corresponding vertical slots (for example, 39 and 41), the product will be cut into perfectly matched kebabs. To remove the kebabs from the container the cutting device 67 is inserted through the peripheralmost vertical slot on one of the sides 35 and is used to cut through the slotted container upward from the top of the vertical slot to the top of the slotted container. This process is then repeated at the opposite peripheralmost vertical slot of the side and the central portion of the side between the slots can be pulled back, exposing the rows of perfectly matched kebabs. Alternatively, the sides of the slotted container could be cut away in a different manner, or the remains of the moisture-resistant liner 17 could be used to lift the kebabs from the container 15. As illustrated in FIG. 7, the resulting kebab 67 has a rectangular cross section and four crisp straight vertical sides.

The assembly 11 may also be shipped with the layers of product 21 already cut into cubes, in which case the skewers would hold the cut kebabs in place. Specifically, the ends of the skewers 27 would be restrained from horizontal movement by the upper and lower trays 23, 25, and the amount of movement of the product would be limited by the skewers 27 and by the force of the adjacent cubes of product against one another. As a result, damage to the product should be significantly less than when the kebabs are packed in bundles together.

When the layers of product 21 are cut into cubes prior to shipment, the amount of air contacting the sides of the cubes is minimized by the presence of the virtually perfectly matched surface of product of the neighboring kebab flush against the sides of the cubes.

Thus, there is provided a shipping and storage assembly which provides for the convenient shipment, storage and assembly of kebabs with a minimum of wasted space and product spoilage.

I claim:

1. A method of shipping and processing product with a generally rectangular cutting jig having two pairs of opposing vertical sides, each of said pair of opposing sides of said jig including at least one slot for receiving the blade of a cutting device, wherein said one slot is aligned with a corresponding slot in said opposing side, comprising the steps of:
    sealing said slots of said jig for shipment;
    inserting a plurality of layers of product between said two pairs of opposing sides of said jig;
    securing said plurality of layers of product within said two pairs of opposing sides of said jig;
    shipping said jig to a new location with said plurality of layers of product within said jig and said slots sealed;
    unsealing said slots; and
    using said jig for guiding the cutting of said plurality of layers of product within said jig.

2. The method of claim 1, wherein said slots are unsealed while said jig is being used for guiding the cutting of said plurality of layers of product within said jig.

3. The method of claim 2, further comprising the step of disposing of said jig after unsealing said slots.

4. The method of claim 3, further comprising the step of inserting a plurality of skewers through said plurality of layers of product when said slots are sealed.

5. The method of claim 4, wherein said skewers are inserted prior to the transported of said jig.

* * * * *

UNITED STATES PATENT AND TRADEMARK OFFICE
CERTIFICATE OF CORRECTION

PATENT NO. : 4,934,026

DATED : June 19, 1990

INVENTOR(S) : Robert J. McNerney

It is certified that error appears in the above-identified patent and that said Letters Patent is hereby corrected as shown below:

In column 3, at line 58, change "Figure 2 perspective" to --Figure 2 is a perspective--.

In column 3, at line 59, change "and layer removed" to --and upper insulating layer removed--.

In column 4, at line 17, change "The outer container" to --The outer shipping container--.

Figure 1:
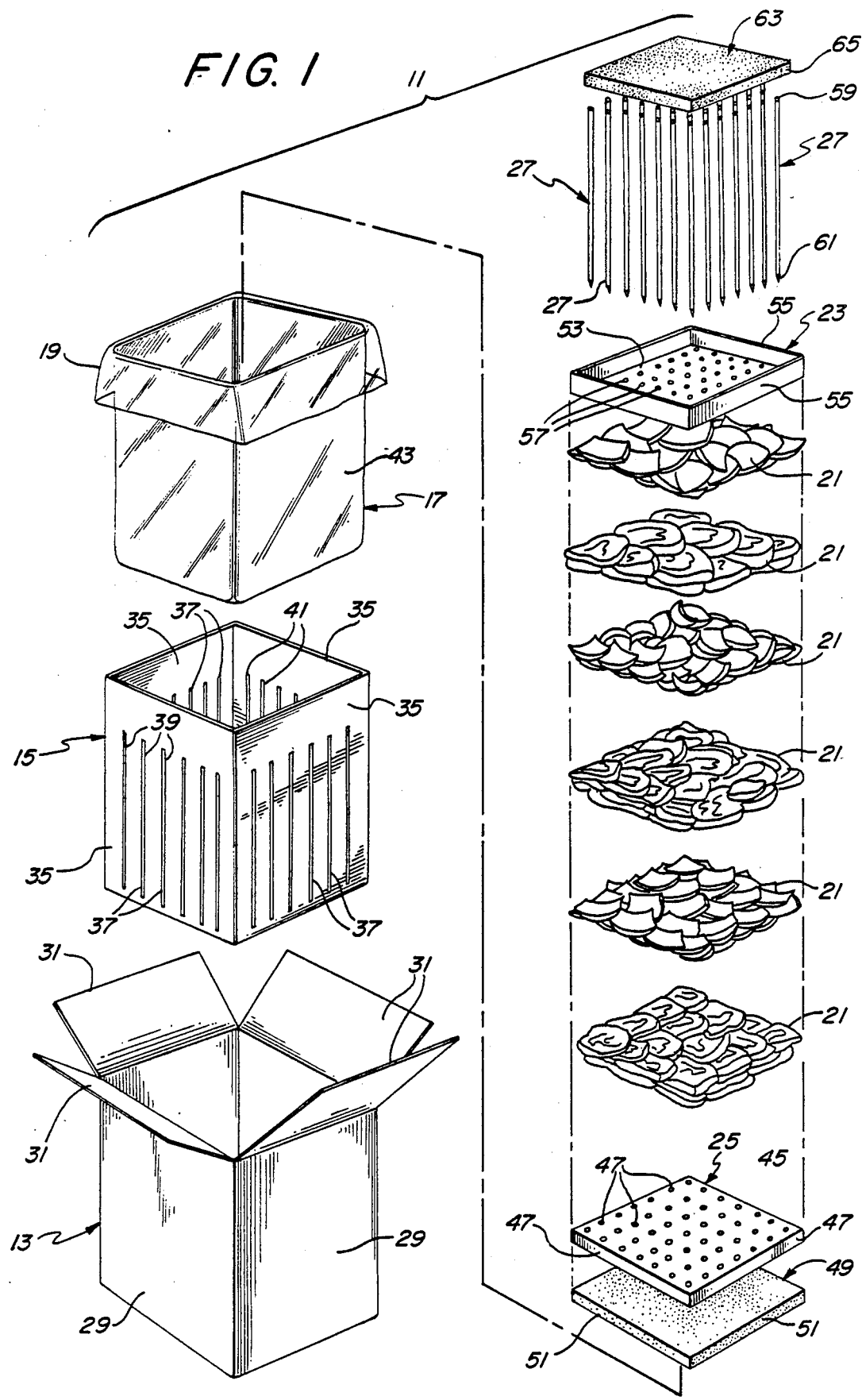
FIG. 1 is an exploded perspective view of a shipping assembly in accordance with the principles of the present invention.

In column 4, at line 29, change "Figure, the" to --Figure 1, the--.

In column 10, at line 28, change "the transported of" to --the transporting of--.

Signed and Sealed this

Twentieth Day of October, 1992

Attest:

DOUGLAS B. COMER

*Attesting Officer*  *Acting Commissioner of Patents and Trademarks*